United States Patent
Heidemeyer et al.

(10) Patent No.: US 9,713,887 B2
(45) Date of Patent: Jul. 25, 2017

(54) INJECTION MOLDING SYSTEM AND INJECTION MOLDING METHOD FOR PRODUCING FIBER-REINFORCED PLASTICS MATERIAL PARTS

(71) Applicant: SKZ-KFE gGmbH Kunststoff-Forschung und-Entwicklung, Würzburg (DE)

(72) Inventors: Peter Heidemeyer, Kitzingen (DE);
Christian Deubel, Kürnach (DE);
Karsten Kretschmer, Waldbrunn (DE);
Klaus Schink, Hettstadt (DE)

(73) Assignee: SKZ-KFE GGMBH KUNTSTOFF-FORSCHUNG UND-ENTWICKLUNG (DE)

( * ) Notice: Subject to any disclaimer, the term of this patent is extended or adjusted under 35 U.S.C. 154(b) by 194 days.

(21) Appl. No.: 14/431,355

(22) PCT Filed: Aug. 28, 2013

(86) PCT No.: PCT/EP2013/067819
§ 371 (c)(1),
(2) Date: Mar. 26, 2015

(87) PCT Pub. No.: WO2014/048666
PCT Pub. Date: Apr. 3, 2014

(65) Prior Publication Data
US 2015/0239158 A1    Aug. 27, 2015

(30) Foreign Application Priority Data

Sep. 27, 2012 (DE) .................. 10 2012 217 586

(51) Int. Cl.
*B29C 45/00* (2006.01)
*B29C 45/18* (2006.01)
(Continued)

(52) U.S. Cl.
CPC ...... *B29C 45/0005* (2013.01); *B29C 45/1816* (2013.01); *B29C 45/47* (2013.01); *B29K 2105/06* (2013.01); *B29K 2105/12* (2013.01)

(58) Field of Classification Search
CPC ................................. B29C 2045/466
See application file for complete search history.

(56) References Cited

U.S. PATENT DOCUMENTS 3,453,356 A     7/1969 Kent, Jr. et al.
2007/0007685 A1  1/2007 Gleich et al.

FOREIGN PATENT DOCUMENTS

DE     2 420 686      11/1974
DE     42 36 662 A1    5/1993
(Continued)

OTHER PUBLICATIONS

Electronic translation of DE19754409 to Bayer.*
(Continued)

*Primary Examiner* — Jill Heitbrink
(74) *Attorney, Agent, or Firm* — Reising Ethington P.C.

(57) ABSTRACT

An injection molding system, to produce fiber-reinforced plastics material parts, has an injection molding device with a housing and a housing bore formed therein. A screw shaft, which is rotatably drivable about a rotational axis and can be displaced along the rotational axis, is arranged in the housing bore to melt and introduce plastics material into a mold. For feeding fibers, the injection molding system furthermore has a feed device, which is configured in such a way that cut fibers can be fed through a feed opening directly into the housing bore. The injection molding system according to the invention allows simple and flexible production of fiber-reinforced plastics material parts.

17 Claims, 10 Drawing Sheets

(51) Int. Cl.
    *B29C 45/47*     (2006.01)
    *B29K 105/06*    (2006.01)
    *B29K 105/12*    (2006.01)

(56) References Cited

FOREIGN PATENT DOCUMENTS

| | | |
|---|---|---|
| DE | 197 54 409 A1 | 6/1999 |
| DE | 299 06 250 U1 | 8/1999 |
| EP | 1 099 525 A1 | 5/2001 |
| EP | 1741541 * | 1/2007 |
| EP | 2 072 217 A1 | 6/2009 |
| JP | 08103921 | 4/1996 |

OTHER PUBLICATIONS

German Examination Report, Application No. 10 2012 217 586.5, Dated: Apr. 26, 2013, 6 pages.
PCT Search Report, Application No. PCT/EP2013/067819, Filing Date: Aug. 28, 2013, Mailing Date: Jan. 17, 2014, 5 Pages.

\* cited by examiner

INJECTION MOLDING SYSTEM AND INJECTION MOLDING METHOD FOR PRODUCING FIBER-REINFORCED PLASTICS MATERIAL PARTS

This application claims the priority of German Patent Application, Serial No. 10 2012 217 586.5, filed on 27 Sep. 2012, pursuant to 35 U.S.C. 119(a)-(d), the content of which is incorporated herein by reference in its entirety as if fully set forth herein.

FIELD OF THE DISCLOSURE

The disclosure relates to an injection molding system and method for producing fiber-reinforced plastics material parts.

BACKGROUND

An injection molding system is known from DE 42 36 662 A1, which, in order to produce fiber-reinforced plastics material parts, has an injection molding device or an injection molding machine and a feed device for feeding fibers into the injection molding machine. The fibers are unwound from roving spools and fed as continuous fibers through intake nozzles into a decompression zone of the screw shaft of the injection molding machine. The continuous fibers are then broken in the injection molding machine and mixed in a mixing zone into the molten plastics material. The drawback is that the fiber content and the fiber length are difficult to adjust in this injection molding system.

SUMMARY

The device is based on the object of providing an injection molding system, which allows fiber-reinforced plastic material parts to be produced in a simple and flexible manner.

This object is achieved by an injection molding system for producing fiber-reinforced plastics material parts, comprising an injection molding device with a first housing, a first housing bore formed in the first housing, a first feed opening for feeding plastics material into the first housing bore, a screw shaft for melting and introducing the plastics material into a mold, which is arranged in the first housing bore and is rotatably drivable about an associated first rotational axis, a second feed opening for feeding fibers into the first housing bore, a discharge opening for discharging the plastics material and the fibers from the first housing bore into the mold, and a feed device for feeding the fibers into the plastics material located in the injection molding device, wherein the feed device is configured in such a way that cut fibers are feedable through the second feed opening into the first housing bore. Since the feed device allows the feeding of cut fibers into the injection molding device or injection molding machine, the fiber content and/or the fiber length can be easily and flexibly adjusted during the production of fiber-reinforced plastics material parts. This may, for example, take place in such a way that a specific quantity of fibers with a specific fiber length is placed in the feed device, which then meters the fibers into the injection molding device. Alternatively, the feed device may have a cutting mechanism so fibers of a specific fiber length are cut from continuous fibers and fed in a specific quantity to the feed device, which then meters the cut fibers into the injection molding device. Since the fiber quantity and/or the fiber length can be easily and flexibly adjusted, a high degree of flexibility is easily achieved in the production of fiber-reinforced plastics material parts. In particular, fiber-reinforced plastics material parts can be produced that have fibers with a defined fiber length, the fiber length being variable within a wide range. The fibers preferably have a length of 2 mm to 100 mm, and in particular from 15 mm to 50 mm. The fibers are preferably configured as long-cut fibers. Since the fibers are metered by means of the feed device directly into the injection molding device, in other words without prior mixing into plastics material, the feeding of the fibers and the structure of the injection molding system is comparatively simple. The feeding of the fibers by means of the feed device and the production of plastics material parts by means of the injection molding device are matched to one another by means of a control mechanism. The feed device is preferably operated discontinuously and in accordance with the injection molding device. The screw shaft or injection molding screw shaft is preferably arranged concentrically in the first housing bore and can be displaced along the first rotational axis in order to discharge the plastics material and the fibers from the first housing bore and to introduce them into the mold. Alternatively, the screw shaft or injection molding screw shaft may be arranged concentrically in the first housing bore, but not be displaceable along the first rotational axis, so the plastics material and the fibers are discharged from the first housing bore and introduced by means of a piston-cylinder unit into the mold. A piston-cylinder unit of this type is also called a shooting pot.

An injection molding system the feed device of which comprises: a multi-shaft screw machine with a second housing, a plurality of second housing bores penetrating one another, a plurality of feed screw shafts, which are concentrically arranged in the second housing bores and are rotatably drivable about associated second rotational axes, a fiber feed opening for feeding the fibers into the second housing bores, and a fiber discharge opening for discharging the fibers from the second housing bores easily ensures metered feeding of fibers into the injection molding device. The multi-shaft screw machine is preferably configured as a two-shaft or twin-shaft screw machine that is rotatably drivable in the same direction. The multi-shaft screw machine is preferably arranged on the side of the injection molding device.

An injection molding system the feed device of which comprises a suction mechanism for sucking the fibers through the fiber feed opening into the second housing bores by means of an air stream, and a filter mechanism arranged between the suction mechanism and the second housing bores for filtering the fibers out of the air stream allows an introduction of the fibers into the feed device so the latter can meter the fibers into the injection molding device. By means of the suction mechanism, the fibers are sucked through the fiber feed opening into the multi-shaft screw machine. The sucked-in fibers are filtered out of the air stream by the filter mechanism so the feed screw shafts can strip the filtered-out fibers from the filter mechanism and entrain them.

An injection molding system the feed device of which has a multi-shaft screw machine configured as a two-shaft screw machine, with the two-shaft screw machine having feed screw shafts that are rotatably drivable in the same direction allows a feeding and metering of the fibers into the injection molding device. The feed screw shafts are preferably configured to tightly mesh.

An injection molding system in which the second housing is fastened to the first housing and the second housing bores open into the first housing bore allows the direct feeding of the fibers into the injection molding device. Since the feed device with its housing is directly arranged on the housing of the injection molding device, the housing bores of the feed device open directly into the housing bore of the injection molding device so the fibers are feedable into the injection molding device.

An injection molding system in which the second feed opening in cross section has the shape of an eight and the feed screw shafts extend into the second feed opening allows the direct feeding of the fibers into the injection molding device. Owing to the configuration of the second feed opening, the feed screw shafts can extend into the latter and up to the housing bore of the injection molding device so the fibers can be conveyed up to the molten plastics material.

An injection molding system in which the second housing is fastened to the first housing and encloses an angle $\phi$ with a horizontal plane, and the angle $\phi$ is in a range of $0°\leq\phi\leq90°$, in particular $0°\leq\phi\leq60°$ and in particular $0°\leq\phi\leq45°$, allows the feeding of the fibers into the injection molding device. In particular the required installation space of the injection molding system can be varied by the angle $\phi$.

An injection molding system in which the screw shaft has a length L along the first rotational axis and a diameter D, wherein the ratio of L/D $\geq20$, in particular L/D$\geq25$, in particular L/D$\geq30$, and in particular L/D$\geq40$, allows the production of fiber-reinforced plastics material parts. Owing to the comparatively longer screw shaft or injection molding screw shaft, the fed fibers are incorporated into the molten plastics material so a homogeneous plastics material-fiber mixture is produced.

An injection molding system in which the second feed opening has a spacing $A_1$ from the first feed opening and a spacing $A_2$ from the discharge opening, wherein there applies: $1\leq A_1/A_2\leq4$, in particular $1\leq A_1/A_2\leq3$, and in particular $1\leq A_1/A_2\leq2$, allows the production of fiber-reinforced plastics material parts. Owing to the arrangement of the second feed opening, on the one hand, the plastics material as a consequence of the spacing $A_1$ is already molten and in that, on the other hand, because of the spacing $A_2$, an adequate mixing of the fibers into the plastics material melt takes place so that a homogeneous plastics material-fiber mixture is produced.

An injection molding system in which the injection molding device has a melting zone and a feed zone arranged downstream in a plastics material conveying direction and the screw shaft in the feed zone has a higher flight depth compared with the melting zone allows the feeding of fibers. Since the screw shaft or injection molding screw shaft in the feed zone has a comparatively higher flight depth, the molten plastics material is conveyed past the second feed opening substantially without pressure so the fibers can easily be fed through the second feed opening into the injection molding device.

An injection molding system in which the injection molding device has a feed zone and a homogenizing zone arranged downstream in a plastics material conveying direction and the screw shaft in the homogenizing zone has at least one mixing and/or shearing element allows the production of a homogeneous plastics material-fiber mixture.

An injection molding system in which the at least one mixing and/or shearing element is exchangeable allows a flexible adaptation of the injection molding screw shaft to the plastics material and/or the fibers so fiber-reinforced plastics material parts with a high quality can be reliably produced. The screw tip of the screw shaft or injection molding screw shaft is preferably releasably fastened for exchange.

An injection molding system in which the injection molding device and the feed device are movable together on a bed allows the production of fiber-reinforced plastics material parts. Since the injection molding device is movable together with the feed device, the injection molding device can be axially moved for the purpose of maintenance and/or repair in relation to the mold half not arranged on the injection molding device. As a result, for example, the discharge opening or the machine nozzle can easily be cleaned. Moreover, a thermal separation from the colder mold half not arranged on the injection molding device is thereby produced.

An injection molding system in which the filter mechanism forms a plurality of flow channels, which, in a flow direction of the air stream, in each case have a flow cross section that widens, in particular widens in a step-shaped manner, allows the feeding of the fibers. Since the flow channels of the filter mechanism in the flow direction have a widening flow cross section, a clogging of the filter mechanism is effectively prevented. Fibers, which are sucked into one of the flow channels, find a comparatively slight grip there because of the widening flow cross section so they are sucked because of the air stream through the flow channel and removed via a suction line. Those fibers, which thus arrive in one of the flow channels, are sucked off substantially unhindered through the filter mechanism. As a result, clogging of the filter mechanism is prevented. The dimensions of the flow channels are matched to the fibers to be conveyed so, on the one hand, an adequately high air stream is present and fine dust particles are sucked off through the filter mechanism but, on the other hand, the fibers to be conveyed cannot normally get through the filter mechanism. As a result a comparatively long service life and a high degree of reliability of the filter mechanism can be achieved.

An injection molding system in which the filter mechanism has a plurality of filter elements resting on one another and adjacent filter elements in each case form a cross sectionally gap-like flow channel allows feeding of the fibers. The filter mechanism is modularly constructed from a large number of similarly formed filter elements, which are attached to form the filter mechanism. The filter elements therefore form a filter package. A filter mechanism or a filter package with any desired filter length can easily be formed by the filter elements. The filter elements arranged in a package-shaped manner are installed in a suction opening of the housing of the multi-shaft screw machine. The number of filter elements depends on the filter length required and the construction size of the multi-shaft screw machine. For example, at least 10, in particular at least 20, and in particular at least 30 filter elements are arranged one after the other in the fiber feed direction.

An injection molding system in which the feed device has a monitoring sensor for detecting a backing-up of the plastics material ensures a reliable production of fiber-reinforced plastics material parts. A backflow or backing-up of the molten plastics material from the injection molding device into the feed device is monitored by the monitoring sensor. The monitoring takes place, for example, by means of a sensor for the direct or indirect measurement of the torque of the feed screw shafts and/or a pressure sensor and/or a temperature sensor. If an adjustable limit value for the torque and/or the pressure and/or the temperature is exceeded, a backing-up of the plastics material is detected. In order to avoid clogging of the feed mechanism or the multi-shaft screw machine with plastics material, a countermeasure or counter-measures can be introduced.

An injection molding system in which the feed device has a cutting mechanism for cutting continuous fibers into fibers with an adjustable fiber length allows the feeding of cut fibers. By means of the cutting mechanism, continuous fibers can be provided in a predefined quantity and a pre-predefined or adjustable fiber length, which can then be fed by means of the multi-shaft screw machine to the injection molding device.

The invention is furthermore based on the object of providing an injection molding method, which allows fiber-reinforced plastics material parts to be produced.

This object is achieved by a method for producing fiber-reinforced plastics material parts having the steps: providing an injection molding system, comprising an injection molding device with a first housing, a first housing bore formed in the first housing, a first feed opening for feeding plastics material into the first housing bore, a screw shaft for melting and introducing the plastics material into a mold, which is arranged in the first housing bore and is rotatably drivable about an associated first rotational axis, a second feed opening for feeding fibers into the first housing bore, and a discharge opening for discharging the plastics material and the fibers from the first housing bore into the mold, and a feed device for feeding the fibers into the plastics material located in the injection molding device, wherein the feed device is configured in such a way that cut fibers are feedable through the second feed opening into the first housing bore, feeding plastics material through the first feed opening into the injection molding device, melting the plastics material in the injection molding device, feeding fibers by means of the feed device through the second feed opening into the molten plastics material, mixing the fed fibers into the plastics material by means of the screw shafts, and introducing the mixture of plastics material and fibers into the mold to produce a fiber-reinforced plastics material part. The feed device is preferably operated discontinuously in accordance with the injection molding device. The advantages of the injection molding method according to the invention correspond to the advantages already described of the injection molding system according to the invention. The injection molding method according to the invention may additionally be developed by the features of the preferred embodiments described above.

Further features, advantages and details of the invention emerge from the following description of an embodiment.

DESCRIPTION OF THE PREFERRED EMBODIMENT

Figure 1:
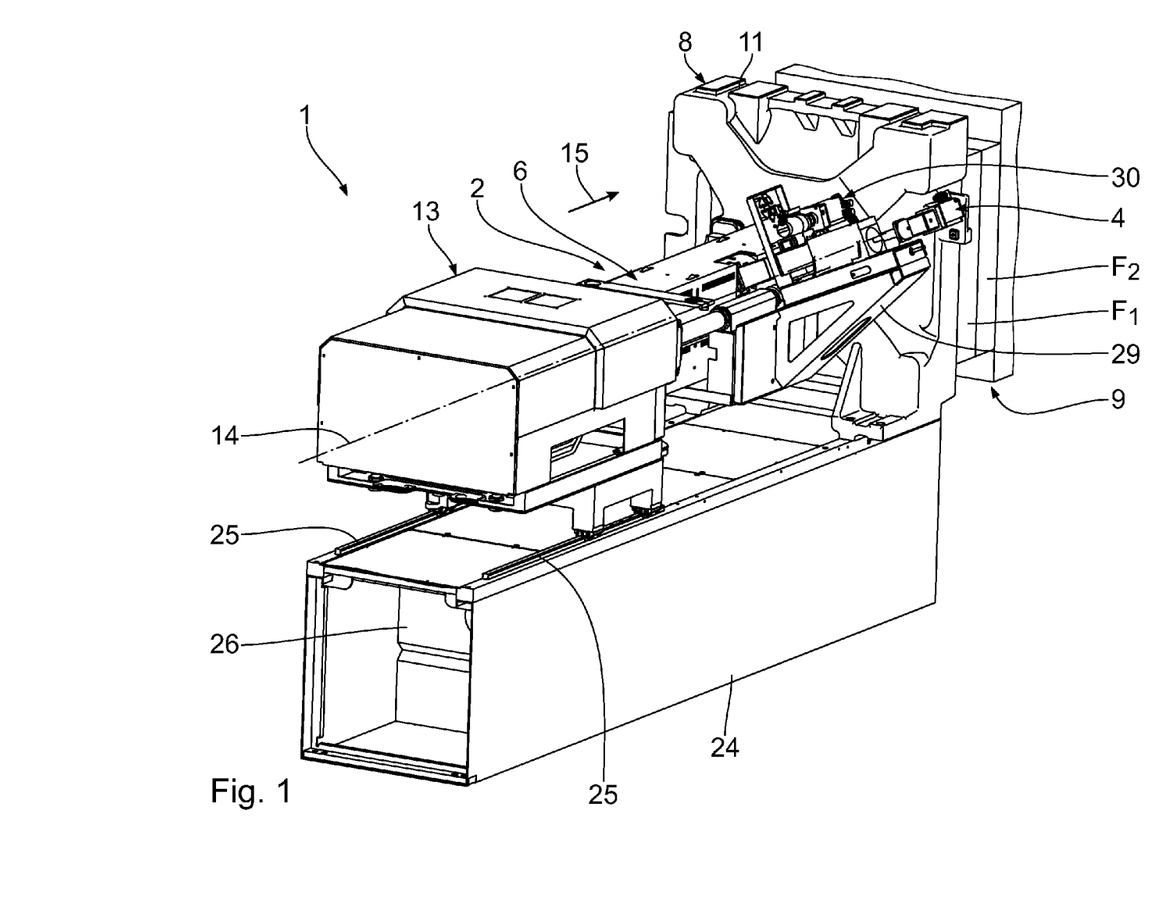
FIG. 1 shows a perspective view of an injection molding system for producing fiber-reinforced plastics material parts.

FIG. 1 shows an injection molding system 1, to produce fiber-reinforced plastics material parts, has an injection molding device or injection molding machine 2 for preparing plastics material 3 and a feed device 4 for feeding fibers 5.

Figure 2:
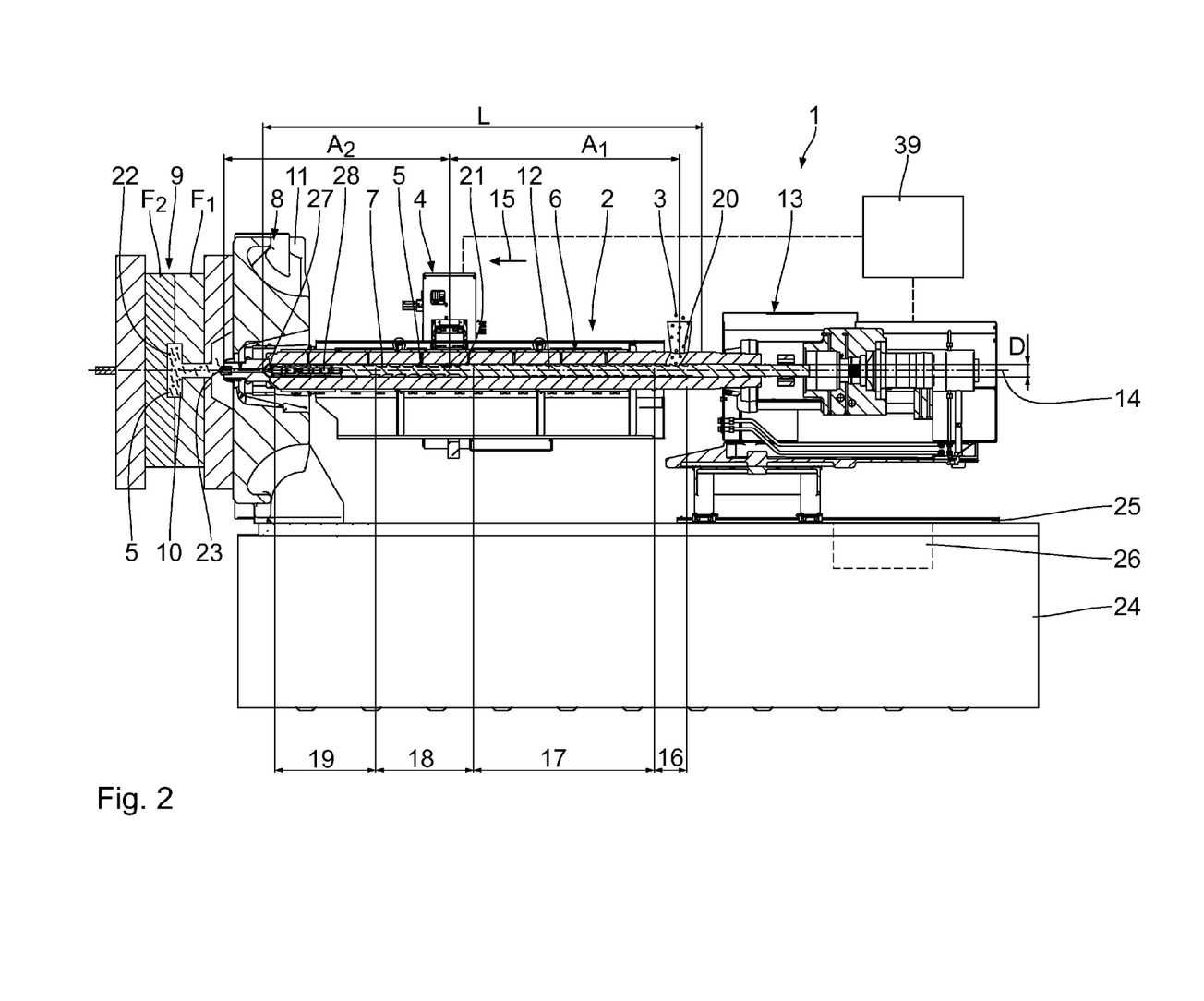
FIG. 2 shows a longitudinal section through an injection molding device of the injection molding system in FIG. 1.

The injection molding device 2 has a first housing 6, in which a first housing bore 7 is formed as shown in FIG. 2. A closing unit 8, which comprises a clamping plate 11 fastened to the housing 6 and a mold 9, is fastened to the housing 6. The mold 9 has a first mold half $F_1$, which is fastened to the clamping plate 11 and, together with a second mold half $F_2$ for producing plastics material parts, forms a mold cavity 10 or a cavity as shown in FIG. 2. The housing bore 7 opens through the clamping plate 11 and the first mold half $F_1$ into the mold cavity 10. To demold the plastics material parts produced, the second mold half $F_2$ is axially displaceable in the conventional manner relative to the first mold half $F_1$. An injection molding screw shaft 12, which, by means of a conventional drive-lift mechanism 13, to melt and inject the plastics material 3 into the mold 9, is rotatably drivable about a first rotational axis 14 and can be displaced along the first rotational axis 14, is concentrically arranged in the housing bore 7.

The injection molding device 2, along a plastics material conveying direction 15, forms an intake zone 16, a melting zone 17, a feed zone 18 and a homogenizing zone 19. Formed in the intake zone 16 to feed the plastics material 3 is a first feed opening 20, through which the plastics material 3 can be fed as granules into the housing bore 7. Owing to the configuration of the injection molding screw shaft 12, the fed plastics material 3 is plasticized in the melting zone 17 because of the rotation of the injection molding screw shaft. A second feed opening 21 for feeding the fibers 5 into the housing bore 7 is formed in the region of the downstream feed zone 18 in the housing 6. In the following homogenizing zone 19, the injection molding screw shaft 12 is configured in such a way that the fed fibers 5 can be mixed into the molten plastics material 3 or the plastics material melt, so a homogeneous fiber-plastics material mixture 22 is produced. At the end of the homogenizing zone 19, the housing 6 has a discharge opening 23, through which the fiber-plastics material mixture 22 can be injected into the mold 9 by means of the drive-lift mechanism 13.

The injection molding system 1 has a bed 24, on which the injection molding device 2 and the clamping plate 11 are arranged. The first mold half $F_1$ is rigidly fastened to the clamping plate 11, whereas the second mold half $F_2$ can be displaced in the conventional manner along the plastics material conveying direction 15 to demold a plastics material part that has been produced. For maintenance and repair purposes, the injection molding device 2 together with the clamping plate 11 fastened thereon and the first mold half $F_1$ and also together with the feed device 4 fastened to the injection molding device 2 is movable along the plastics material conveying direction 15 on guide rails 25. The method takes place in the conventional manner by means of a drive mechanism 26.

For mixing in the feed fibers 5, the injection molding screw shaft 12 has a comparatively greater length L. The ratio of the length L of the injection molding screw shaft 12 along the rotational axis 14 and its diameter D is L/D≥20, in particular L/D≥25, in particular L/D≥30, and in particular L/D≥40. To feed the fibers 5, the injection molding screw shaft 12 in the feed zone 18 has a higher flight depth in comparison to the melting zone 17. The free space between the injection molding screw shaft 12 and the housing 6 is therefore comparatively large, so the molten plastics material 3 is movable past the feed opening 21 substantially without pressure and the fibers 5 are feedable easily. The second feed opening 21 has a spacing $A_1$ from the first feed opening 20 along the rotational axis 14. Accordingly, the second feed opening 21 has a spacing $A_2$ from the discharge opening 23 along the rotational axis 14. The ratio of the spacings $A_1$ and $A_2$ is $1 \leq A_1/A_2 \leq 4$, in particular $1 \leq A_1/A_2 \leq 3$, and in particular $1 \leq A_1/A_2 \leq 2$. As a result, an adequately long melting zone 17 and homogenizing zone 19 are equally ensured. For adaptation of the homogenizing zone 19 to the plastics material 3 and/or the fibers 5, the injection molding screw shaft 12 has a releasably fastened screw tip 27, so at least one mixing and/or shearing element 28 of the injection molding screw shaft 12 is exchangeable.

The feed device 4 is used for feeding fibers 5 into the injection molding device 2. The feed device 4 is configured in such a way that cut fibers 5 are feedable through the second feed opening 21 directly into the housing bore 7. For this purpose, the feed device 4 is fastened on the side of the injection molding device 2 by means of a support frame 29.

Figure 3:
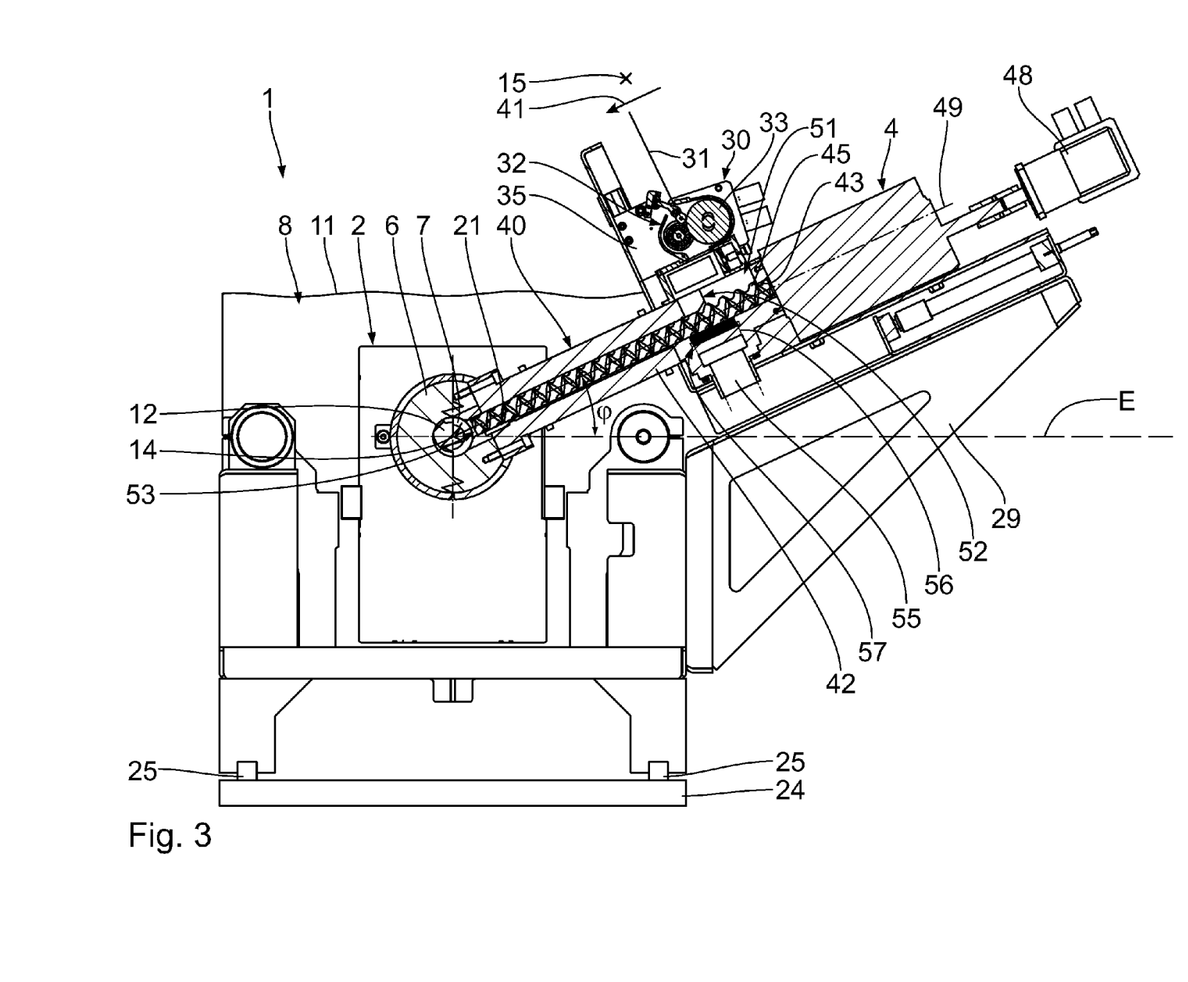
FIG. 3 shows a cross section through the injection molding device in FIG. 2 in the region of a feed device.
Figure 4:
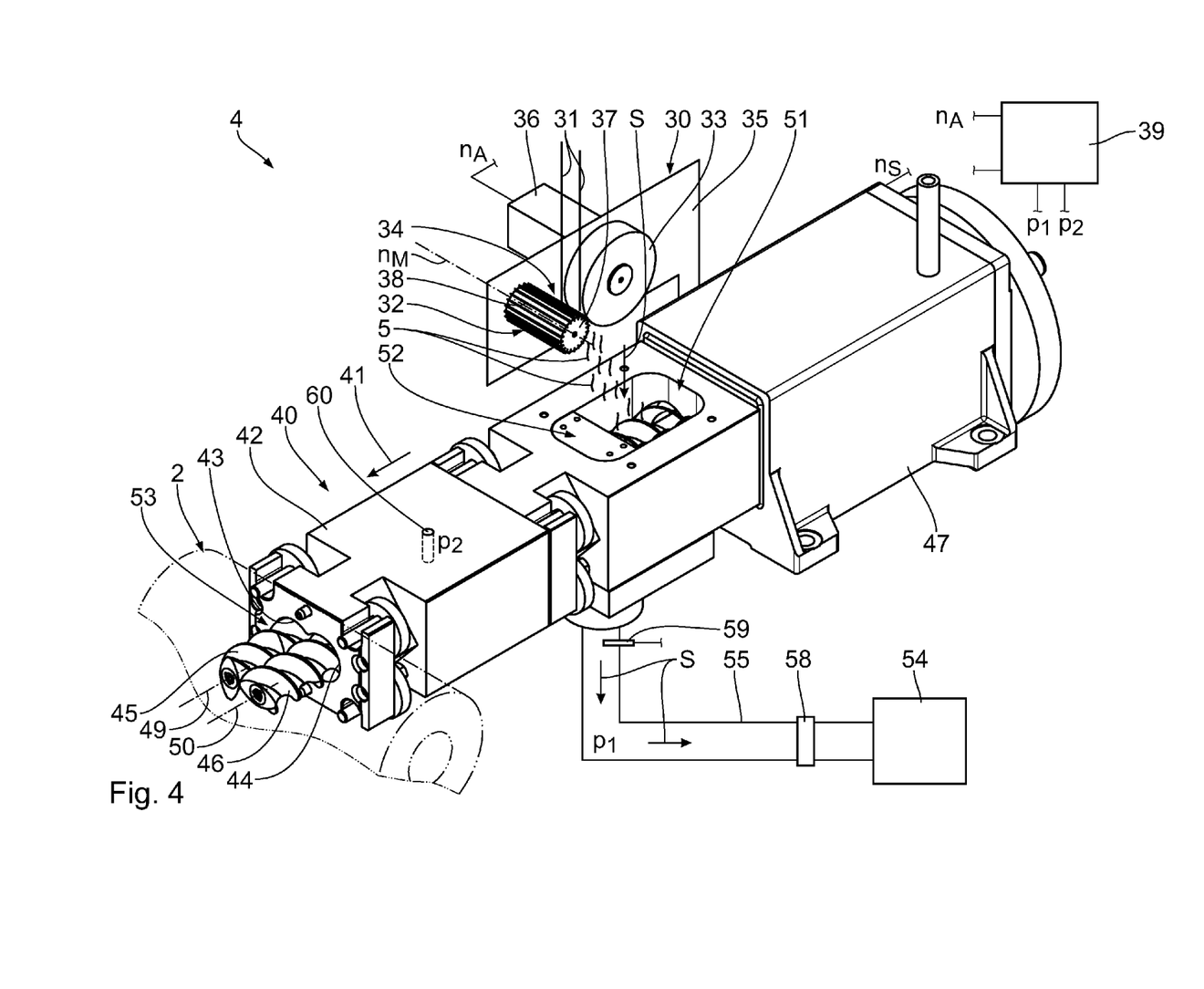
FIG. 4 shows a schematic view of the feed device in FIG. 3.

As shown in FIGS. 3-7, the feed device 4 has a cutting mechanism 30, which is used for cutting continuous fibers 31. The cut fibers 5 are produced by cutting the continuous fibers 31. The cutting mechanism 30, for cutting the continuous fibers 31, has a cutting element 32 and a pressing element 33, which are roll-shaped and delimit a gap 34. The cutting element 32 and the pressing element 33 are rotatably mounted on a base frame 35, the pressing element 33 being rotatably drivable by means of an associated drive motor 36 as shown in FIG. 4. To cut the continuous fibers 31, the cutting element 32 has a roller-shaped base body 37, on which a plurality of cutting blades 38 are fastened, distributed over the periphery. The drive motor 36 is activated by means of a control mechanism 39 to control the injection molding system 1, so the rotational drive speed $n_A$ can be adjusted. The cutting element 32 rests against the pressing element 33, so the latter co-rotates upon a rotation of the pressing element 33 at a rotational speed $n_M$ corresponding to the rotational drive speed $n_A$. As a result, the quantity of fibers 5 produced can be adjusted or metered. The fiber length of the fibers 5 can be adjusted by means of the number or the spacing of the cutting blades 38. Fibers 5 with a fiber length of 2 mm to 100 mm, in particular of 15 mm to 50 mm are preferably produced by means of the cutting mechanism 30. The continuous fibers 31 are fed to the cutting mechanism 30 by means of a spool or spools, not shown in more detail. The contact pressure between the cutting element 32 and the pressing element 33 can be adjusted in that the cutting element 32 can be displaced relative to the pressing element 33. As a result, a plurality of continuous fibers 31 can be simultaneously cut, in particular when the distance between the fiber rovings or spools and the cutting mechanism 30 is comparatively long.

Figure 6:
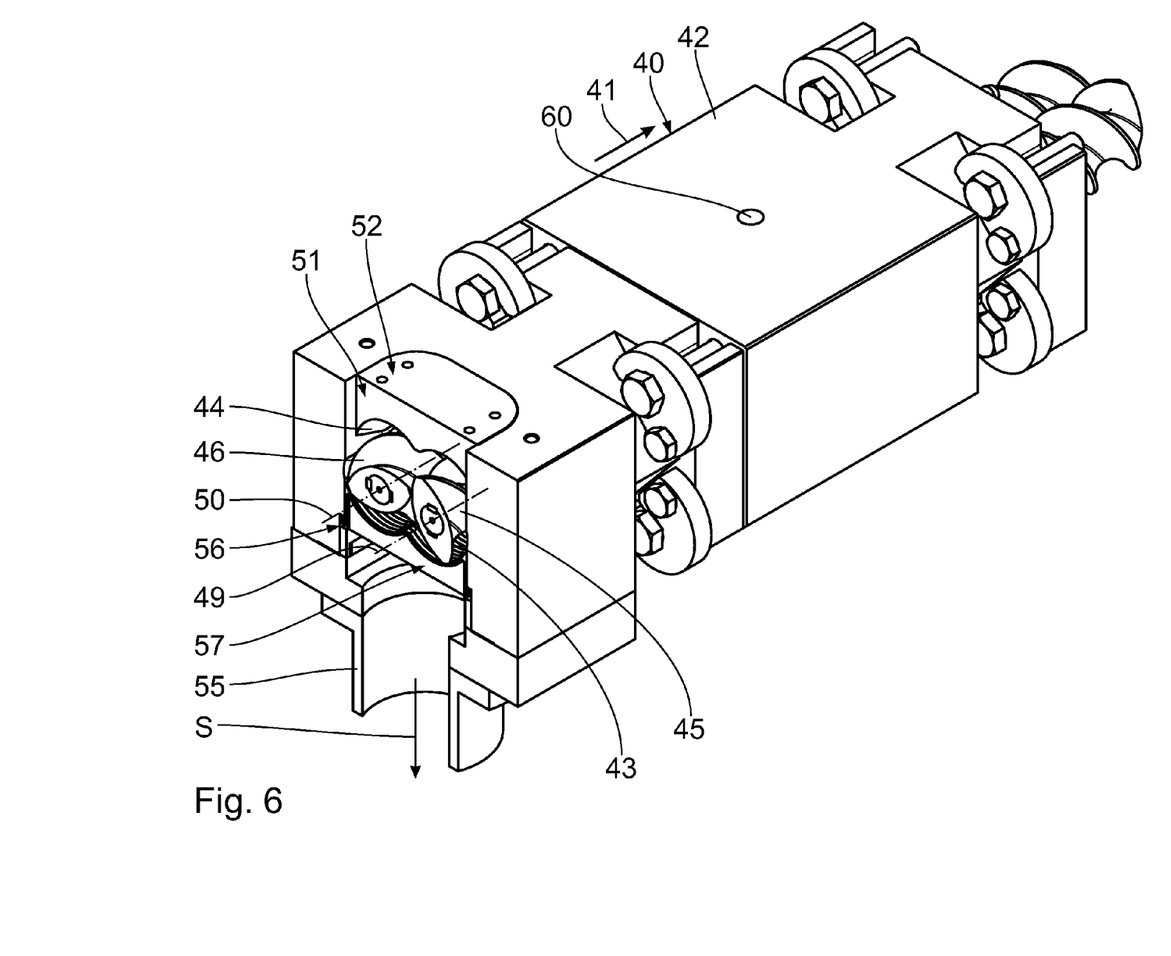
FIG. 6 shows a perspective cross section through the feed device in the region of a filter mechanism.

As shown in FIGS. 4 and 6, a two-shaft screw machine 40 or twin shaft screw machine is arranged downstream of the cutting mechanism 30. The two-shaft screw machine 40 defines a fiber feed direction 41 of the cut fibers 5. The two-shaft screw machine 40 is used for the lateral feeding of the fibers 5 into the injection molding device 2 and is accordingly also called a side feed machine. The screw machine 40 has a second housing 42, in which two second housing bores 43, 44 that penetrate one another are formed. The housing bores 43, 44 run parallel to one another. A respective associated feed screw shaft 45, 46 is arranged concentrically to the respective housing bore 43 or 44 in the housing bores 43, 44. The feed screw shafts 45, 46 are rotatably drivable in the same direction, in other words in the same rotational directions, about a respective associated rotational axis 49 or 50 by a branching gearing 47 by means of a drive motor 48 as shown in FIG. 3. The rotational speed $n_S$ of the feed screw shafts 45, 46 can be adjusted by means of the control mechanism 39.

To feed the fibers 5 cut by means of the cutting mechanism 30 into the screw machine 40, a fiber feed opening 51 as best seen in FIG. 4 is formed on an upper side of the housing 42 facing the cutting mechanism 30. The fiber feed opening 51 is delimited in the fiber feed direction 41 by an inlet element 52. The inlet element 52 will be described in more detail below. To discharge the fibers 5 from the screw machine 40, the housing bores 43, 44 on the end face of the housing 42 form a fiber discharge opening 53.

To suck the fibers 5 into the screw machine 40, the feed device 4 has a suction mechanism 54. The suction mechanism 54 is connected by a suction line 55 to a suction opening 56, which is formed in the housing 42. The suction mechanism 54 and the suction line 55 are shown only schematically in FIG. 4.

Figure 5:
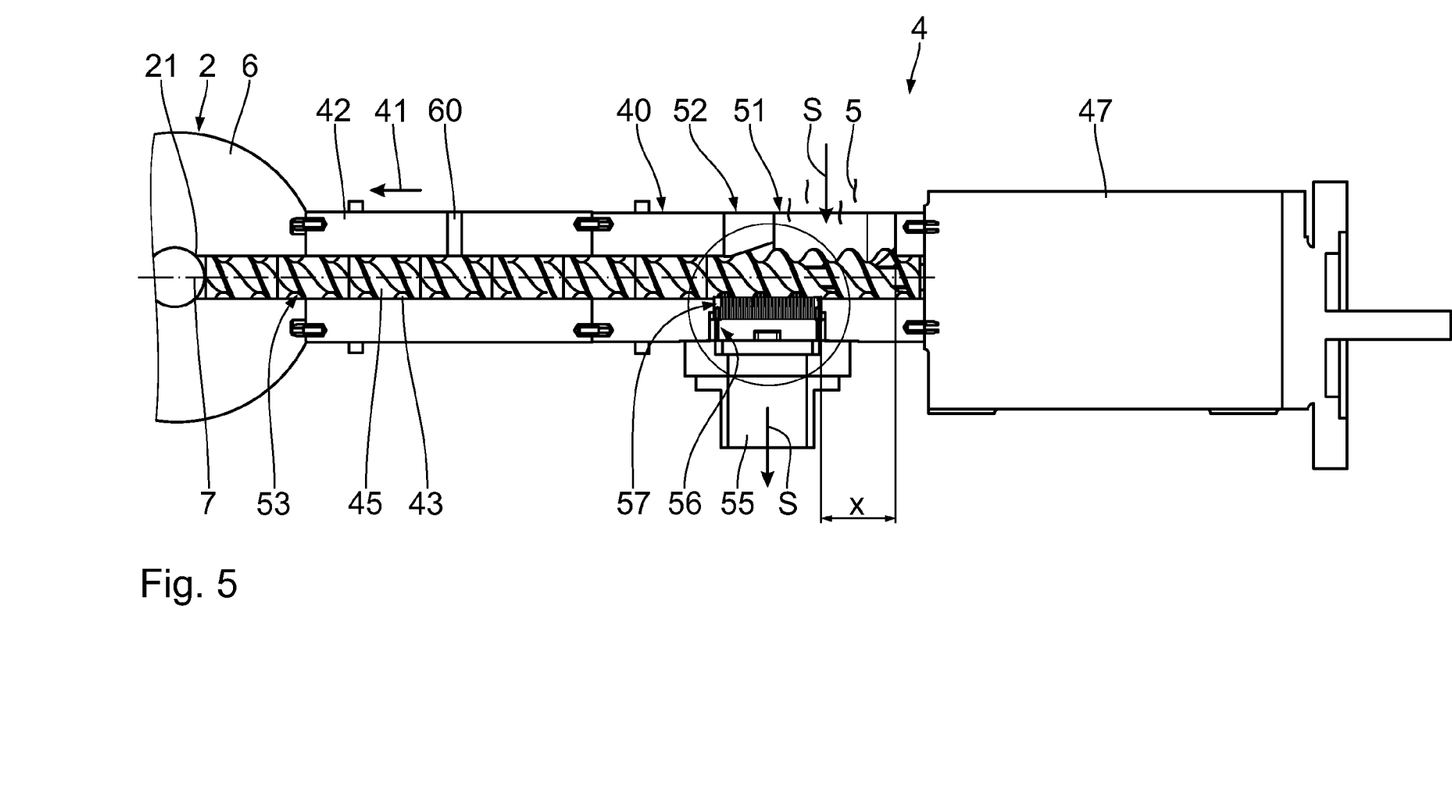
FIG. 5 shows a longitudinal section through the feed device.

As shown in FIG. 5 the suction opening 56 is formed on a lower side of the housing 42 opposing the fiber feed opening 51 and arranged in the fiber feed direction 41 or in the direction of the rotational axes 49, 50 offset with respect to the fiber feed opening 51 by a spacing x. An air stream S, which runs through the fiber feed opening 51, the housing bores 43, 44, the suction opening 56 and the suction line 55, can be produced by the suction mechanism 54 as shown in FIG. 4. To prevent entry of the fibers 5 sucked up by means of the air stream S into the suction line 55, a filter mechanism 57 is arranged in the suction opening 56 in order to filter the fibers 5 out of the air stream S. The filter mechanism 57 will be described in detail below.

To protect the suction mechanism 54 from fibers 5, which arrive in the suction line 55 through the filter mechanism 57, a fiber filter 58 is arranged in the suction line 55. The fiber filter 58 can easily be exchanged and is, in particular, part of a filter exchange mechanism, not shown in more detail, which, by a simple linear displacement, allows an exchange of a fiber filter 58 for a new fiber filter 58. In order to detect clogging of the filter mechanism 57 and/or the fiber filter 58, a pressure sensor 59 for monitoring the air pressure $p_1$ between the filter mechanism 57 and the fiber filter 58 is arranged in the suction line 55. The pressure sensor 59 has a signal connection to the control mechanism 39, which evaluates the measured values for the air pressure $p_1$. Moreover, a monitoring sensor configured as a pressure sensor 60, which measures the pressure $p_2$ in the housing bores 43, 44, is arranged in the housing 42 between the fiber discharge opening 53 and the filter mechanism 57. The pressure sensor 60 has a signal connection to the control mechanism 39, which evaluates the measured values for the pressure $p_2$. The pressure sensor 60 is used to detect a backing-up of the plastics material 3 located in the injection device 2 through the fiber discharge opening 53 counter to the fiber feed direction 41 into the housing bores 43, 44.

For the direct feeding of the fibers 5 into the housing bore 7, the second housing 42 is directly fastened to the first housing 6, so the second housing bores 43, 44 open directly into the first housing bore 7. For this purpose, the second feed opening 21 cross sectionally has the shape of a horizontal eight, so the feed screw shafts 45, 46 can extend into the second feed opening 21 as shown in FIG. 3. By means of the support frame 29, the second housing 42 is fastened to the first housing 6 in such a way that these enclose an angle φ with one another relative to a horizontal plane E, in which $0° \leq \phi \leq 90°$, in particular $0° \leq \phi \leq 60°$ and in particular $0° \leq \phi \leq 45°$.

Figure 7:
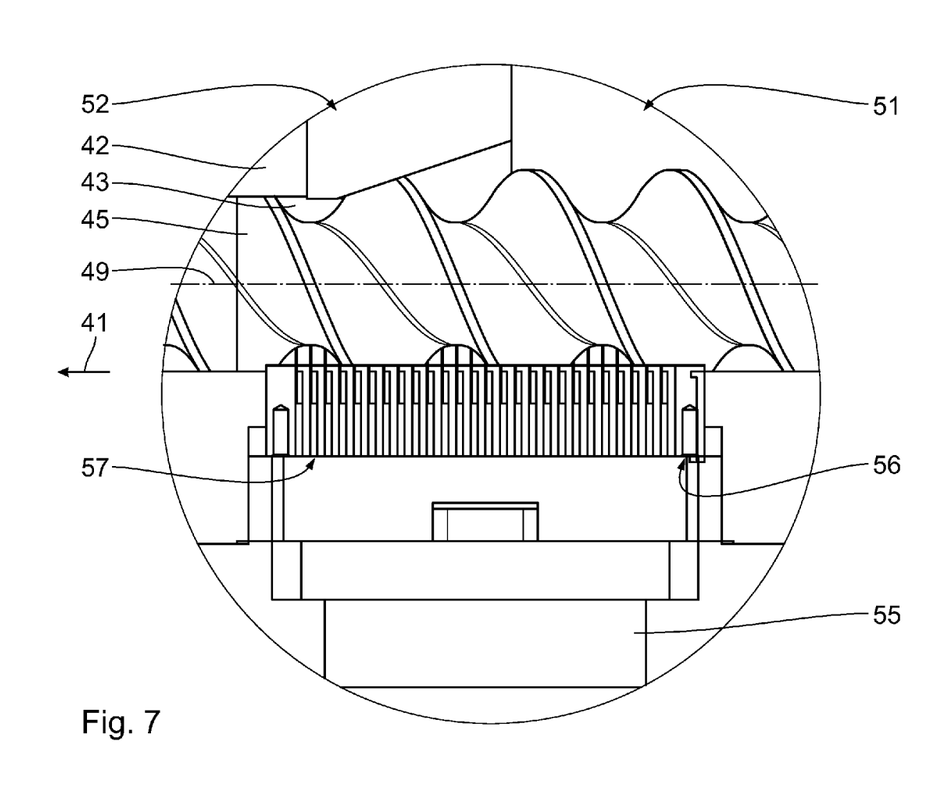
FIG. 7 shows an enlarged longitudinal section through the feed device in the region of the filter mechanism.
Figure 8:
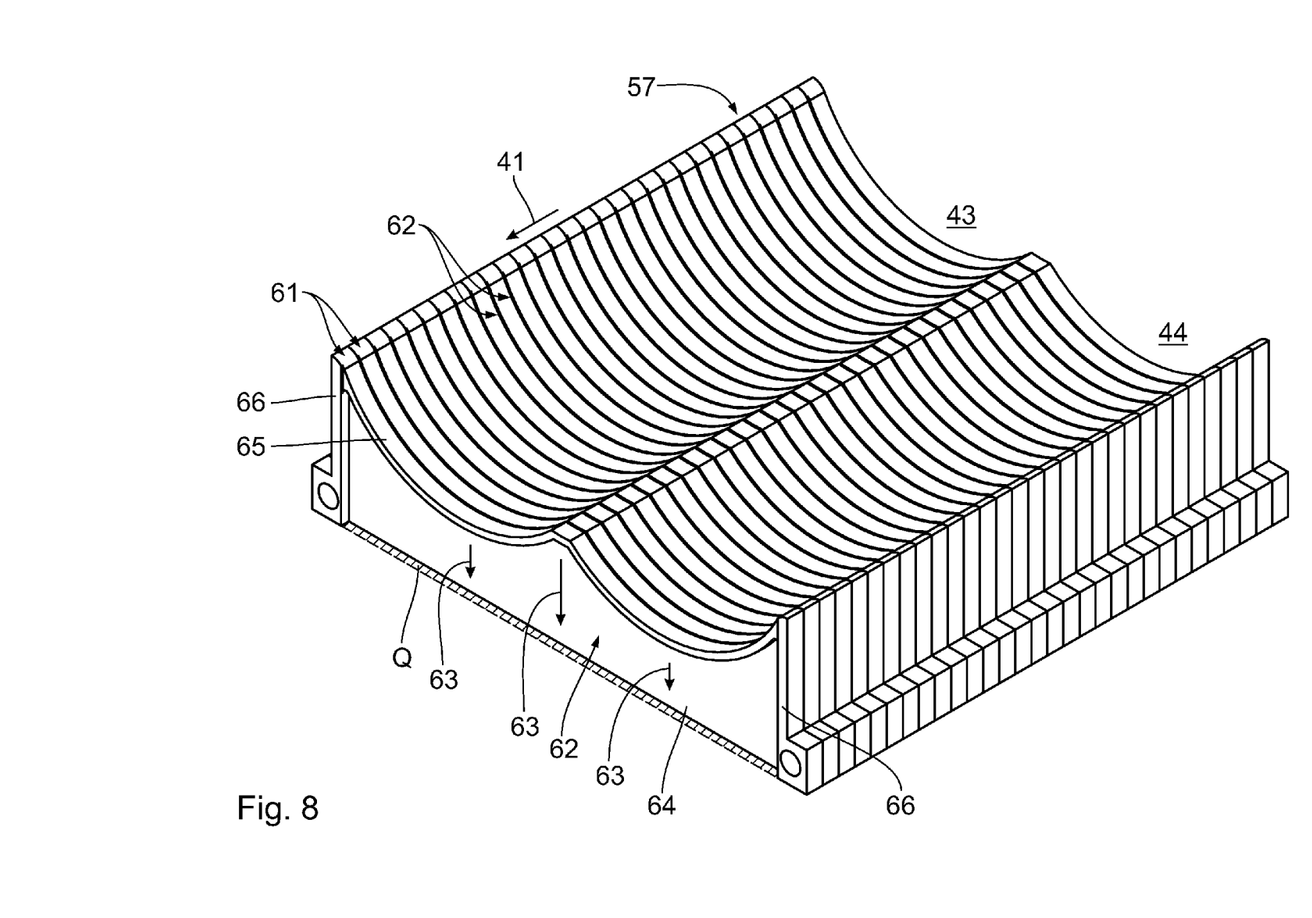
FIG. 8 shows a perspective view of the filter mechanism constructed from a plurality of filter elements.
Figure 9:
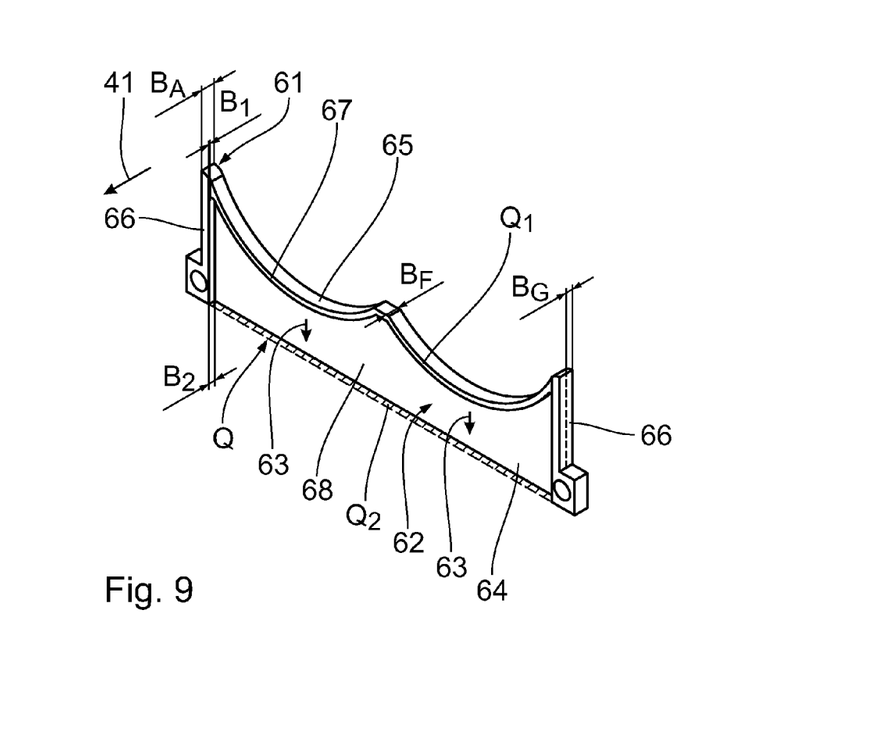
FIG. 9 shows a perspective view of a filter element in FIG. 8.
Figure 10:
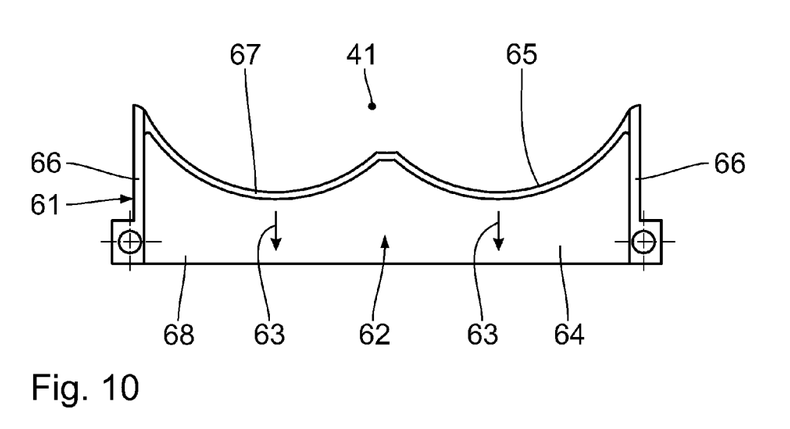
FIG. 10 shows a front view of the filter element in FIG. 9.

As shown in FIGS. 7 and 8, the filter mechanism 57 is constructed from a plurality of similar filter elements 61, which are arranged one after the other in the fiber feed direction 41 or in the direction of the rotational axes 49, 50. The filter elements 61 are formed from a metal, preferably from steel or aluminum. Two respective adjacent filter elements 61 delimit a gap-like flow channel 62, the cross section of which runs substantial transverse to the fiber feed direction 41. The last filter element 61 in the fiber feed direction 41, with the housing 42, delimits a corresponding flow channel 62. The flow channels 62 have, in a flow direction 63 running perpendicular to the fiber feed direction 41, a widening flow cross section Q. As shown in FIGS. 9 and 10, each of the filter elements 61, to form the associated flow channel 62, has a base plate 64, on which a filter web 65 is arranged on a side facing the housing bores 43, 44 and to the side thereof, two spacers 66 are arranged. The filter web 65 runs transverse to the fiber feed direction 41 to form the gap-like flow channel 62. To allow the fibers 5 to be stripped off cleanly from the filter mechanism 57 or the filter webs 65, the filter webs 65 and the base plates 64 have a cross sectional shape corresponding to the housing bores 43, 44. The spacers 66 are web-shaped and arranged on the side of the associated filter web 65 so they run in the flow direction 63 and laterally delimit the associated flow channel 62. As shown in FIG. 9, the spacers 66, in the fiber feed direction 41, have a width $B_A$, which is greater than a width $B_F$ of the associated filter web 65 and greater than a width $B_G$ of the associated base plate 64 in the fiber feed direction 41. If a filter element 67 rests with its spacers 66 against the base plate 64 of an adjacent filter element 61, the associated flow channel 62 is formed by this.

Since the width $B_F$ of the filter web 65 is greater than the width $B_G$ of the base plate 64, the flow cross section Q of the respective flow channel 62 widens in a step-shaped manner in the flow direction 63. The respective flow channel 62 has a first channel portion 67, the cross section $Q_1$ of which is delimited by the filter web 65 and the spacers 66 and the base plate 64 of the adjacent filter element 61. The first channel portion 67, in the fiber feed direction 41, has a minimal first channel width $B_1$, which is produced from the difference between the widths $B_A$ and $B_F$. With regard to the channel width $B_1$: $0.01\ mm \leq B_1 \leq 0.04\ mm$ and in particular $0.05\ mm \leq B_1 \leq 0.2\ mm$. Arranged downstream of the first channel portion 67 in the flow direction 63 is a second channel portion 68, which has a minimal second channel width $B_2$, which is produced from the difference between the widths $B_A$ and $B_G$. There applies to the second channel width $B_2$: $0.5\ mm \leq B_2 \leq 3.0\ mm$ and in particular $0.8\ mm \leq B_2 \leq 2.0\ mm$. The cross section $Q_2$ of the second channel portion 68 is delimited by the base plate 64 and the spacers 66 of a filter element 61 and the base plate 64 of the adjacent filter element 61. With regard to the width $B_G$: $B_G \leq 1.5\ mm$, in particular $B_G \leq 1.0\ mm$ and in particular $B_G \leq 0.5\ mm$.

Figure 11:
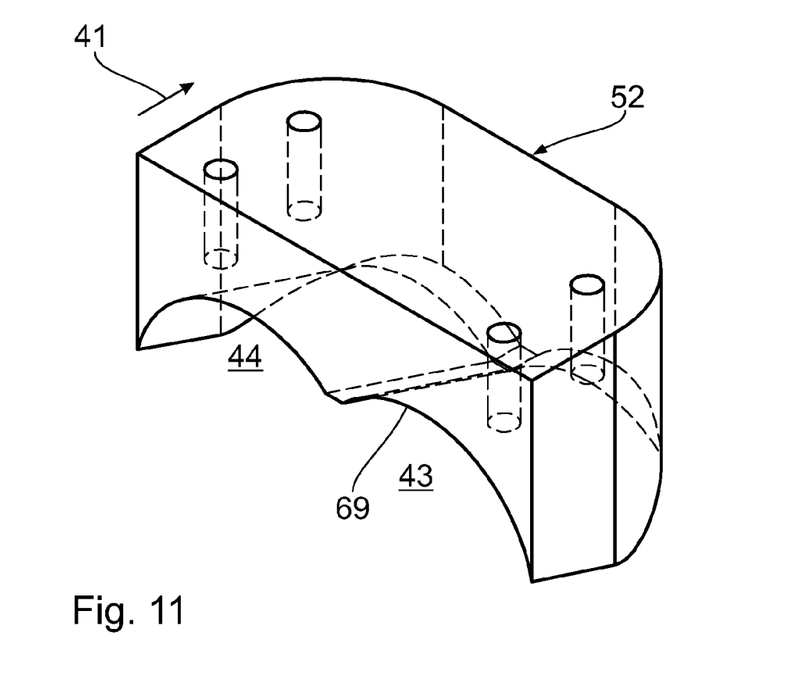
FIG. 11 shows a perspective view of an inlet element of the feed device.
Figure 12:
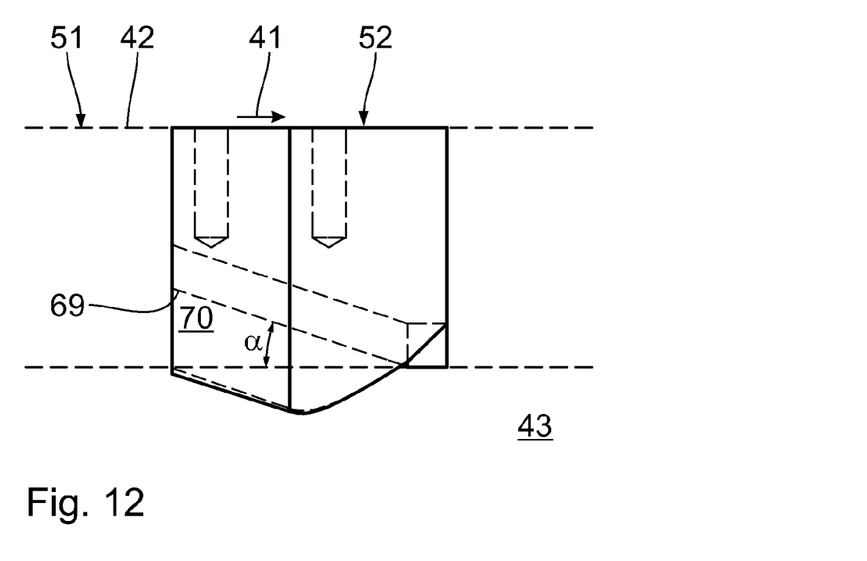
FIG. 12 shows a side view of the inlet element in FIG. 11.

The inlet element 52 shown in FIGS. 11 and 12 is used to improve the intake behavior of the screw machine 40. The inlet element 52 has an inlet wall 69 facing the housing bores 43, 44. The inlet wall 69 forms—viewed in a vertical longitudinal section parallel to the rotational axes 49 or 50—a linearly running inlet bevel. The inlet wall 69, with the fiber feed direction 41, encloses—viewed in the vertical longitudinal section—an angle α, in which $5° \leq \alpha \leq 20°$. The inlet element 52, in the region of the inlet wall 69, therefore forms an inlet wedge 70, which tapers in the fiber feed direction 41. Viewed in cross section, the inlet wall 69 has a cross sectional shape corresponding to the housing bores 43, 44, so the inlet wall 69 runs out flush with the housing bores 43, 44. The inlet element 52 is exchangeably fastened on the housing 42. Alternatively, the inlet element may be integrated with the housing.

The mode of functioning of the injection molding system 1 is as follows:

Referring to FIG. 2, the injection molding device 2 and the feed device 4 are operated discontinuously by means of the control mechanism 39. To produce a fiber-reinforced plastics material part, plastics material 3 in the form of granules is firstly placed in the intake zone 16 through the first feed opening 20. Owing to the rotation of the injection molding screw shaft 12, the plastics material 3 is conveyed in the plastics material conveying direction 15 into the melting zone 17, where the granules are melted into a melt.

In the feed zone 18, cut fibers 5 are fed to the molten plastics material 3 by means of the feed device 4. For this purpose, the provided continuous fibers 31 are firstly cut by means of the cutting mechanism 30 shown in FIGS. 3 and 4 to form fibers 5 with a desired fiber length. The fiber length is preferably between 2 mm and 100 mm and, in particular, between 15 mm and 50 mm. Owing to the rotational speeds $n_A$ or $n_M$, it is possible to meter the fibers 5. The cut fibers 5 are sucked by the air stream S, which is produced by means of the suction mechanism 54 as shown in FIG. 4, through the fiber feed opening 51 into the housing bores 43, 44.

The air stream S runs through the fiber feed opening 51, the housing bores 43, 44, the filter mechanism 57 arranged in the suction opening 56, the suction line 55 and the fiber filter 58 to the suction mechanism 54. Since the suction opening 56 is arranged offset from the fiber feed opening 51 by the spacing x as shown in FIG. 5, the fibers 5 entrained by the air stream S are already deflected in the fiber feed direction 41 during the sucking in process. Because of the inlet bevel formed by the inlet wall 69 as shown in FIGS. 5 and 7, the fibers 5 can be deflected early in the fiber feed direction 41 and captured by the feed screw shafts 45, 46 and conveyed in the direction of the fiber discharge opening 53. The remaining fibers 5 are sucked past the feed screw shafts 45, 46 to the filter mechanism 57, where the fibers 5 are separated from the air stream S. The fibers 5 coming to rest on the filter mechanism 57 are stripped because of the cross sectional shapes of the filter mechanism 57 corresponding to the housing bores 43, 44 from said filter mechanism and transported away in the fiber feed direction 41. For this purpose, the feed screw shafts 45, 46 have, in a region called the intake region between the fiber feed opening 51 and the end of the filter mechanism 57 located in the fiber feed direction 41, a higher flight volume in comparison to the remaining part of the feed screw shafts 45, 46. Thus, the fibers 5 arrive more easily in the screw flights and are better conveyed in the fiber feed direction 41. The higher flight volume is, for example, achieved by single flight screw elements with a pitch of at least 1.2 to 1.8 times the screw diameter. The light, non-free-flowing and comparatively long fibers 5 are sucked under the feed screw shafts 45, 46 by the air stream S or the suction conveyance so the fibers 5 can be captured by the feed screw shafts 45, 46 and be conveyed.

As shown in FIGS. 8-10, because of the configuration of the flow channels 62, a clogging of the filter mechanism 57 is effectively prevented so the filter mechanism 57 is robust and reliable and has a long service life. Since the gap-like flow channels 62 run transverse to the fiber feed direction 41 in cross section, the fibers 5 are oriented with their fiber length in the direction of the minimal channel width $B_1$ of the first channel portions 67. As a result the probability of a fiber 5 entering the first channel portion 67 is reduced. Fibers 5 which nevertheless enter one of the first channel portions 67, can be sucked out of the first channel portion 67 because of the wider second channel portion 68 and removed from the filter mechanism 57. A clogging of the filter mechanism 57 is therefore prevented. The fibers 5 sucked through the filter mechanism 57 are filtered out of the air stream S by means of the fiber filter 58.

As shown in FIG. 4, the pressure sensor 59 measures the air pressure $p_1$ in the suction line 55 and transmits the measured values to the control mechanism 39, which evaluates them. If the air pressure $p_1$ in the suction line 55 increases, the control mechanism 39 recognizes that the fiber filter 58 has a comparatively high flow resistance and has to be exchanged. If the air pressure $p_1$ in the suction line 55 in contrast reduces, the control mechanism 39 recognizes that the filter mechanism 57 has a comparatively high flow resistance and has to undergo maintenance. The control mechanism 39 emits a corresponding monitoring signal in this case.

The pressure sensor 60 measures the pressure $p_2$ in the housing bores 43, 44. If plastics material 3 escapes from the injection molding device 2 through the fiber discharge opening 53 counter to the fiber feed direction 41 into the housing bores 43, 44, there is a risk of the plastics material 3 or the plastics material melt blocking the filter mechanism 57. The control mechanism 39 evaluates the measured values of the pressure $p_2$ and recognizes when plastics material 3 has arrived at the position of the pressure sensor 60. The control mechanism 39 in this case emits a corresponding warning signal. Because of the warning signal, an operator can introduce counter-measures.

Referring to FIG. 2, the cut fibers 5 arrive by means of the feed device 4 through the fiber discharge opening 53 or the second feed opening 21 directly into the feed zone 18. Since the injection molding screw shaft 12 in the feed zone 18 has a comparatively larger flight depth or a comparatively larger flight volume, the molten plastics material 3 is conveyed past the second feed opening 21 substantially without pressure so the cut fibers 5 can easily be fed. The fed fibers 5 are entrained by the injection molding screw shaft 12 and conveyed into the homogenizing zone 19 where an intensive mixing and homogenizing takes place by means of the mixing and shearing element 28 so a homogeneous plastics material-fiber mixture 22 is produced. The plastics material-fiber mixture 22 firstly collects in front of closed discharge opening 23, so the injection molding screw shaft 12 is moved in a conventional manner in the direction of the drive-lift mechanism 13. In order to ensure a reliable feeding of the fibers 5, the injection molding screw shaft 12 has, in a region approximately corresponding to the lift of the injection molding screw shaft 12, a higher flight volume. This region forms the feed zone 18.

If an adequate quantity of plastics material-fiber mixture 22 is provided, the feeding of the fibers 5 and the plastics material 3 is stopped. The discharge opening 23 is opened and the provided plastics material-fiber mixture 22 is injected into the mold cavity 10 of the mold 9 by a linear movement of the injection molding screw shaft 12, which is carried out by means of the drive-lift mechanism 13.

The fiber-reinforced plastics material part produced in the mold 9 is then demolded. For this purpose, the second mold half $F_2$ is linearly moved relative to the first mold half $F_1$, so the plastics material part can be demolded from the mold 9 and removed.

It is possible with the injection molding system 1 according to the invention to incorporate fibers 5 in any desired quantity and with any desired fiber length directly into a plastics material 3 in an injection molding device 2 or an injection molding machine without an intermediate step being necessary. Apart from cut fibers 5 it is possible to incorporate already cut fibers 5 or other reinforcement materials or fibers, such as, for example, wood fibers or fiber chips. Additionally, additives and/or aggregates may be incorporated.

For the direct feeding and incorporation of the fibers 5, the injection molding unit or the injection molding screw shaft 12 is lengthened in comparison to a standard configuration. The feed device 4 can either be fastened directly on the injection molding device 2 or by means of an adaptor.

The screw tip 27 with the backflow lock and the mixing and/or shearing element(s) 28 can be unscrewed so mixing and/or shearing elements 28 adapted to the fibers 5 and/or the plastics material 3 can be installed in order to allow an optimal distribution of the fibers 5 without damage. The cutting mechanism 30, the multi-shaft screw machine 40 and the injection molding device 2 are matched to one another in such a way that during the metering phase, a uniform proportion of fibers 5 is produced in the plasticized plastics material 3. Alternatively, the injection molding device 2 or the injection molding machine may have an injection molding screw shaft 12 with rigidly formed or arranged mixing and/or shearing elements 28, which are thus not exchangeable. As a result, the injection molding device 2 can be optimized with respect to the structure and the costs for a specific purpose of use. Owing to the single-part structure of the injection molding screw shaft 12, in particular the reliability of the injection molding device 2 is increased as a depositing of plastics material 3 on the injection molding screw shaft 12 is made more difficult.

By means of the feed device 4, the cut fibers 5 or the fibers cut with an adjustable fiber length can be produced by means of the cutting mechanism 30 and are feedable in a defined manner dry, in other words without plasticized plastics material 3, by the two-shaft screw machine 40 to the melt-guiding or plastics material-guiding injection molding device 2. The fibers 5 fed to the injection molding device 2 can thus be directly incorporated in the plastics material 3 or the matrix polymer in order to produce semi-finished products and/or plastics material parts or molded parts in the downstream manufacturing step.

The fibers 5 are reinforcement fibers, such as, for example, carbon fibers, plastics material fibers, glass fibers and/or natural fibers. Using the feed device 4, it is in particular possible to feed long cut fibers, which have only a very small bulk density and only a poor flowability or none at all and are correspondingly difficult to meter, draw in and to convey.

Having thus described the device, various modifications and alterations will occur to those skilled in the art, which modifications and alterations are intended to be within the scope of the invention as defined by the appended claims.

The invention claimed is:

1. An injection molding system for producing fiber-reinforced plastics material parts, comprising:
   an injection molding device having:
      a first housing;
      a first housing bore formed in the first housing;
      a first feed opening for feeding plastics material into the first housing bore;
      a screw shaft for melting and introducing the plastics material into a mold, said screw shaft being arranged in the first housing bore and rotatably drivable about an associated first rotational axis;
      a second feed opening for feeding fibers into the first housing bore; and,
      a discharge opening for discharging the plastics material and the fibers from the first housing bore into the mold; and,
   a feed device for feeding the fibers into the plastics material located in the injection molding device, wherein the feed device is configured to feed cut fibers through the second feed opening into the first housing bore,
   wherein the feed device comprises:
      a multi-shaft screw machine having:
         a second housing;
         a plurality of second housing bores penetrating one another;
         a plurality of feed screw shafts, which are concentrically arranged in the second housing bores and are rotatably drivable about associated second rotational axes;
         a fiber feed opening for feeding the fibers into the second housing bores; and,
         a fiber discharge opening for discharging the fibers from the second housing bores;
      a suction mechanism for sucking the fibers through the fiber feed opening into the second housing bores by means of an air stream; and,
      a filter mechanism arranged between the suction mechanism and the second housing bores for filtering the fibers out of the air stream, wherein the filter mechanism forms a plurality of flow channels, wherein in a flow direction of the air stream, each of the flow channels has a flow cross-section that widens.

2. An injection molding system according to claim 1, wherein the feed device has a multi-shaft screw machine comprising a two-shaft screw machine; and, wherein the two-shaft screw machine has feed screw shafts that are rotatably drivable in the same direction.

3. An injection molding system according to claim 1, wherein the second housing is fastened to the first housing and the second housing bores open into the first housing bore.

4. An injection molding system according to claim 1, wherein the second feed opening in cross section has the shape of an eight and the feed screw shafts extend into the second feed opening.

5. An injection molding system according to claim 1, wherein the second housing is fastened to the first housing and encloses an angle φ with a horizontal plane, and the angle φ is defined as $0° \leq \phi \leq 90°$.

6. An injection molding system according to claim 1, wherein the screw shaft has a length L along the first rotational axis and a diameter D, and wherein the ratio of $L/D \geq 20$.

7. An injection molding system according to claim 1, wherein the second feed opening has a spacing A1 from the first feed opening and a spacing A2 from the discharge opening, wherein $1 \leq A1/A2 \leq 4$.

8. An injection molding system according to claim 1, wherein the injection molding device has a melting zone and a feed zone arranged downstream in a plastics material conveying direction and the screw shaft in the feed zone has a higher flight depth than the screw shaft in the melting zone.

9. An injection molding system according to claim 1, wherein the injection molding device has a feed zone and a homogenizing zone arranged downstream in a plastics material conveying direction and the screw shaft in the homogenizing zone is at least one of a mixing element or a shearing element.

10. An injection molding system according to claim 9, wherein the at least one of the mixing element or the shearing element is exchangeable.

11. An injection molding system according to claim 1, wherein the injection molding device and the feed device are movable together on a bed.

12. An injection molding system according to claim 1, wherein the respective flow cross-section of each of the flow channels widens in a step-shaped manner.

13. An injection molding system according to claim 1, wherein the filter mechanism has a plurality of filter elements adjacent to one another and adjacent filter elements form a gap-like flow channel therebetween.

14. An injection molding system according to claim 1, wherein the feed device has a monitoring sensor for detecting a backing-up of the plastics material.

15. An injection molding system according to claim 1, wherein the feed device has a cutting mechanism for cutting continuous fibers into fibers with an adjustable fiber length.

16. A method for producing fiber-reinforced plastics material parts by injection molding, the method comprising the steps of:
   providing an injection molding system, comprising:
      an injection molding device having:
         a first housing;
         a first housing bore formed in the first housing;
         a first feed opening for feeding plastics material into the first housing bore;
         a screw shaft for melting and introducing the plastics material into a mold, wherein the screw shaft is positioned in the first housing bore and is rotatably drivable about a first rotational axis;
         a second feed opening for feeding fibers into the first housing bore; and,
         a discharge opening for discharging the plastics material and the fibers from the first housing bore into the mold; and,
      a feed device for feeding the fibers into the plastics material located in the injection molding device, wherein the feed device is configured so that cut fibers can be fed through the second feed opening into the first housing bore;
      wherein the feed device comprises:
         a multi-shaft screw machine having:
            a second housing;
            a plurality of second housing bores penetrating one another;

a plurality of feed screw shafts, which are concentrically arranged in the second housing bores and are rotatably drivable about associated second rotational axes;
   a fiber feed opening for feeding the fibers into the second housing bores; and,
   a fiber discharge opening for discharging the fibers from the second housing bores;
a suction mechanism for sucking the fibers through the fiber feed opening into the second housing bores by means of an air stream; and,
a filter mechanism arranged between the suction mechanism and the second housing bores for filtering the fibers out of the air stream, wherein the filter mechanism forms a plurality of flow channels, wherein in a flow direction of the air stream, each of the flow channels has a flow cross-section that widens;
feeding plastics material through the first feed opening into the injection molding device;
melting the plastics material in the injection molding device;
feeding fibers by means of the feed device through the second feed opening into the molten plastics material;
mixing the fed fibers into the plastics material by means of the screw shafts; and,
introducing the mixture of plastics material and fibers into the mold to produce a fiber-reinforced plastics material part.

17. An injection molding system for producing fiber-reinforced plastics material parts, comprising:
an injection molding device having:
   a first housing;
   a first housing bore formed in the first housing;
   a first feed opening for feeding plastics material into the first housing bore;
   a screw shaft for melting and introducing the plastics material into a mold, said screw shaft being arranged in the first housing bore and rotatably drivable about an associated first rotational axis;
   a second feed opening for feeding fibers into the first housing bore; and,
   a discharge opening for discharging the plastics material and the fibers from the first housing bore into the mold; and,
a feed device for feeding the fibers into the plastics material located in the injection molding device, wherein the feed device is configured to feed cut fibers through the second feed opening into the first housing bore,
wherein the feed device comprises:
   a multi-shaft screw machine having:
      a second housing;
      a plurality of second housing bores penetrating one another;
      a plurality of feed screw shafts, which are concentrically arranged in the second housing bores and are rotatably drivable about associated second rotational axes;
      a fiber feed opening for feeding the fibers into the second housing bores; and,
      a fiber discharge opening for discharging the fibers from the second housing bores;
   a suction mechanism for sucking the fibers through the fiber feed opening into the second housing bores by means of an air stream; and,
   a filter mechanism arranged between the suction mechanism and the second housing bores for filtering the fibers out of the air stream, wherein the filter mechanism has a plurality of filter elements adjacent to one another and adjacent filter elements form a gap-like flow channel therebetween.

\* \* \* \* \*